United States Patent
Song (10) Patent No.: US 9,728,761 B2
(45) Date of Patent: Aug. 8, 2017

(54) RECHARGEABLE BATTERY AND BATTERY MODULE

(71) Applicant: SAMSUNG SDI CO., LTD., Yongin-si, Gyeonggi-do (KR)

(72) Inventor: Byung-IL Song, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/828,787

(22) Filed: Aug. 18, 2015

(65) Prior Publication Data

US 2016/0087259 A1 Mar. 24, 2016

(30) Foreign Application Priority Data

Sep. 19, 2014 (KR) .................. 10-2014-0125180

(51) Int. Cl.
- *H01M 2/00* (2006.01)
- *H01M 2/30* (2006.01)
- *H01M 2/20* (2006.01)
- *H01M 2/02* (2006.01)

(52) U.S. Cl.
CPC ............. *H01M 2/30* (2013.01); *H01M 2/204* (2013.01); *H01M 2/206* (2013.01); *H01M 2/0202* (2013.01); *H01M 2/0237* (2013.01); *H01M 2220/20* (2013.01); *H01M 2220/30* (2013.01)

(58) Field of Classification Search
CPC ....................................................... H01M 2/00
See application file for complete search history.

(56) References Cited

U.S. PATENT DOCUMENTS

| | | | |
|---|---|---|---|
| 2011/0081573 A1* | 4/2011 | Kim | H01M 2/0202 429/186 |
| 2011/0223776 A1* | 9/2011 | Ferber, Jr. | H05K 3/325 439/39 |

FOREIGN PATENT DOCUMENTS

| | | |
|---|---|---|
| JP | 07-262982 A | 10/1995 |
| KR | 10-2012-0095290 A | 8/2012 |

* cited by examiner

*Primary Examiner* — Jacob Marks
(74) *Attorney, Agent, or Firm* — Lee & Morse P.C.

(57) ABSTRACT

A rechargeable battery includes an electrode assembly, a case accommodating the electrode assembly, and first and second electrode terminals electrically coupled to the electrode assembly and protruding out of the case, the first electrode terminal having a first terminal magnet, and the second electrode terminal having a second terminal magnet.

17 Claims, 13 Drawing Sheets

RECHARGEABLE BATTERY AND BATTERY MODULE

CROSS-REFERENCE TO RELATED APPLICATION

Korean Patent Application No. 10-2014-0125180, filed on Sep. 19, 2014, in the Korean Intellectual Property Office, and entitled: "Rechargeable Battery and Battery Module," is incorporated by reference herein in its entirety.

BACKGROUND

1. Field

Embodiments relate to a rechargeable battery and a battery module, and more particularly, to a rechargeable battery and a battery module with an improved connecting structure.

2. Description of the Related Art

A rechargeable battery differs from a primary battery in that it can be repeatedly charged and discharged, while the latter is incapable of being recharged.

A low-capacity rechargeable battery is used in small portable electronic devices, e.g., mobile phones, notebook computers, and camcorders, while a high-capacity rechargeable battery can be used as a power source for driving motors, e.g., of a hybrid vehicle, an electric vehicle, and the like. The rechargeable battery may be used in small electronic devices as a single cell battery or in motor-driving power sources, etc., as a battery module in which a plurality of cells are electrically coupled.

In a battery module, electrode terminals of rechargeable batteries are connected by a bus bar. The bus bar may be fixed to the rechargeable battery, e.g., by a nut or by welding.

SUMMARY

A rechargeable battery according to an exemplary embodiment includes an electrode assembly, a case accommodating the electrode assembly, and first and second electrode terminals electrically coupled to the electrode assembly and protruding out of the case, the first electrode terminal having a first terminal magnet, and the second electrode terminal having a second terminal magnet.

The first terminal magnet may be disposed such that an N pole is directed upward, the second terminal magnet may be disposed such that an S pole is directed upward, the first electrode terminal may include a first plate terminal, and a first receiving hole may be formed in the first plate terminal to be inserted by the first terminal magnet.

The second electrode terminal may include a second plate terminal, a second receiving hole may be formed in the second plate terminal to be inserted by the second terminal magnet, the first receiving hole may be formed at one corner portion of the first plate terminal, and the second receiving hole may be formed at the other corner portion of the second plate terminal.

The other corner portion may be diagonally disposed with respect to the one corner portion, the first electrode terminal may include a rod-shaped first pillar terminal an upper part of which may be formed with a stepped groove, and a supporting protrusion may be formed in the stepped groove to protrude in a lateral direction.

A battery module according to another aspect includes rechargeable batteries having first and second electrode terminals that protrude outward; and a connector electrically coupling the rechargeable batteries and attached to the first and second electrode terminals by a magnetic force.

The first electrode terminal may include a first terminal magnet, the second electrode terminal may include a second terminal magnet, the first electrode terminal may include a first plate terminal, and a first receiving hole may be formed in the first plate terminal to be inserted by the first terminal magnet.

The first terminal magnet may be disposed such that an N pole is directed upward, the second terminal magnet may be disposed such that an S pole is directed upward, and the connector may include a first connecting magnet combined to the first terminal magnet and a second connecting magnet combined to the second terminal magnet.

The connector may include a first connector and a second connector, positions at which the connecting magnets of the first and second connectors are installed may be different, and first and second holes may be formed in the first connector to be respectively inserted by the first and second connecting magnets.

The first connecting magnet may be disposed such that an S pole is directed downward, the second connecting magnet may be disposed such that an N pole is directed downward, the first connecting magnet may be installed at one corner portion of the first connector, and the second connecting magnet may be installed at one corner portion of the second connector.

The first electrode terminal may include a rod-shaped first pillar terminal, a first fastening hole may be formed in the connector to be inserted by the first pillar terminal, a stepped groove may be formed at an upper part of the first pillar terminal, a supporting protrusion may be formed to protrude in the stepped groove, and a supporting groove may be formed in the first fastening hole to be inserted by the supporting protrusion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
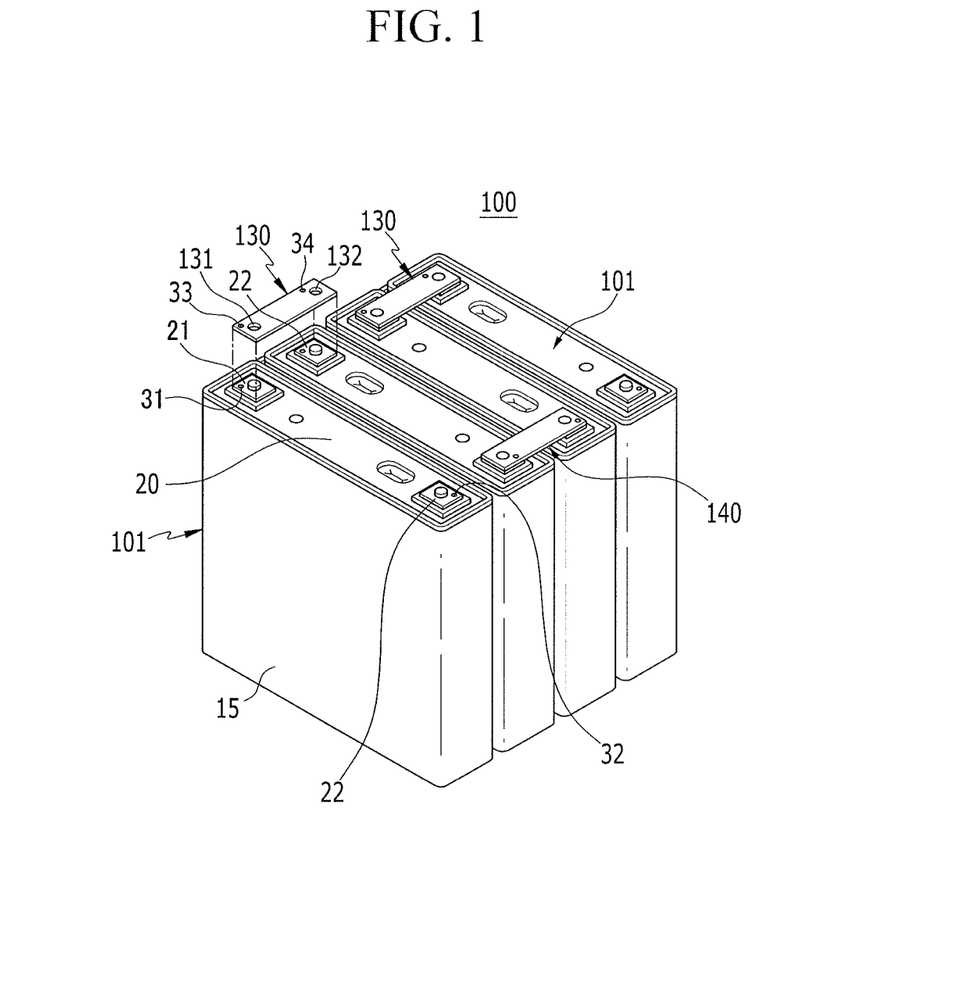
FIG. 1 illustrates a perspective view of a battery module according to a first exemplary embodiment.
Figure 2:
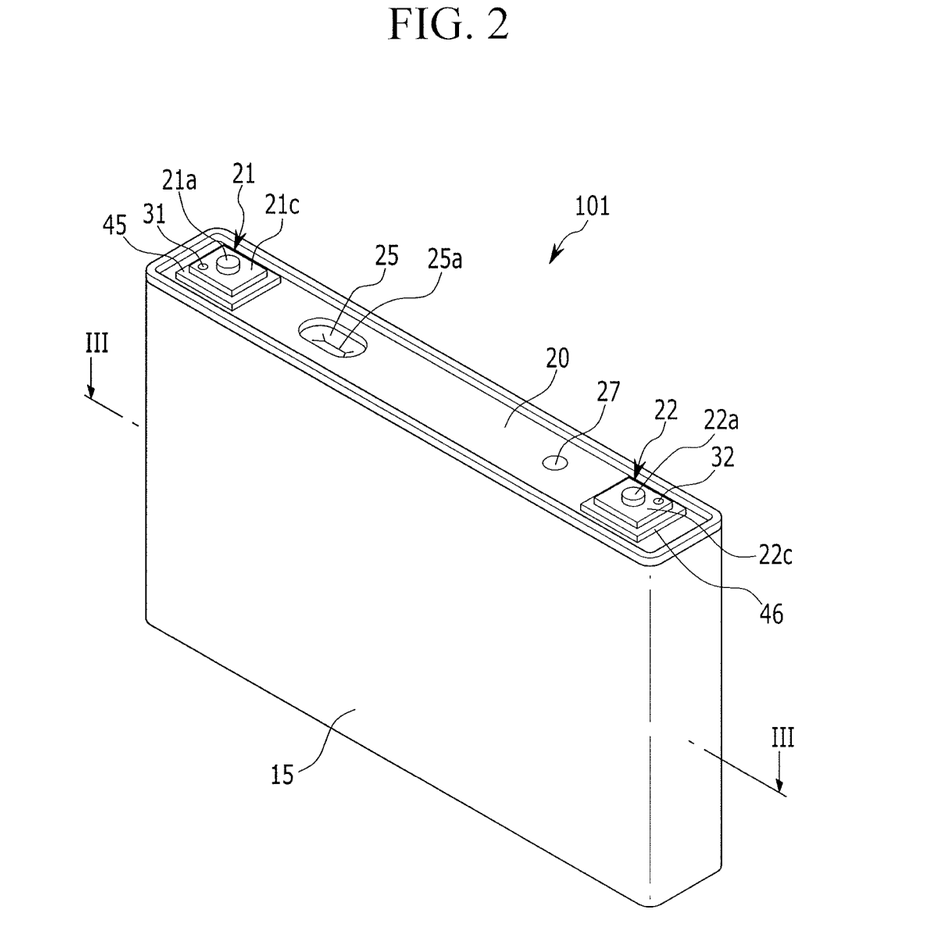
FIG. 2 illustrates a perspective view of a rechargeable battery according to the first exemplary embodiment.

FIG. 1 is a perspective view of a battery module according to a first exemplary embodiment, and FIG. 2 is a perspective view of a rechargeable battery according to the first exemplary embodiment.

Referring to FIGS. 1 and 2, a battery module 100 of the first exemplary embodiment may include a plurality of rechargeable batteries 101 and a connector for electrically coupling the rechargeable batteries 101 to each other. As illustrated in FIG. 2, the connector may include a first connector 130 and a second connector 140. As such, the rechargeable batteries 101 may be stackingly arranged, and may be connected to each other in series by the first and second connectors 130 and 140.

Figure 3:
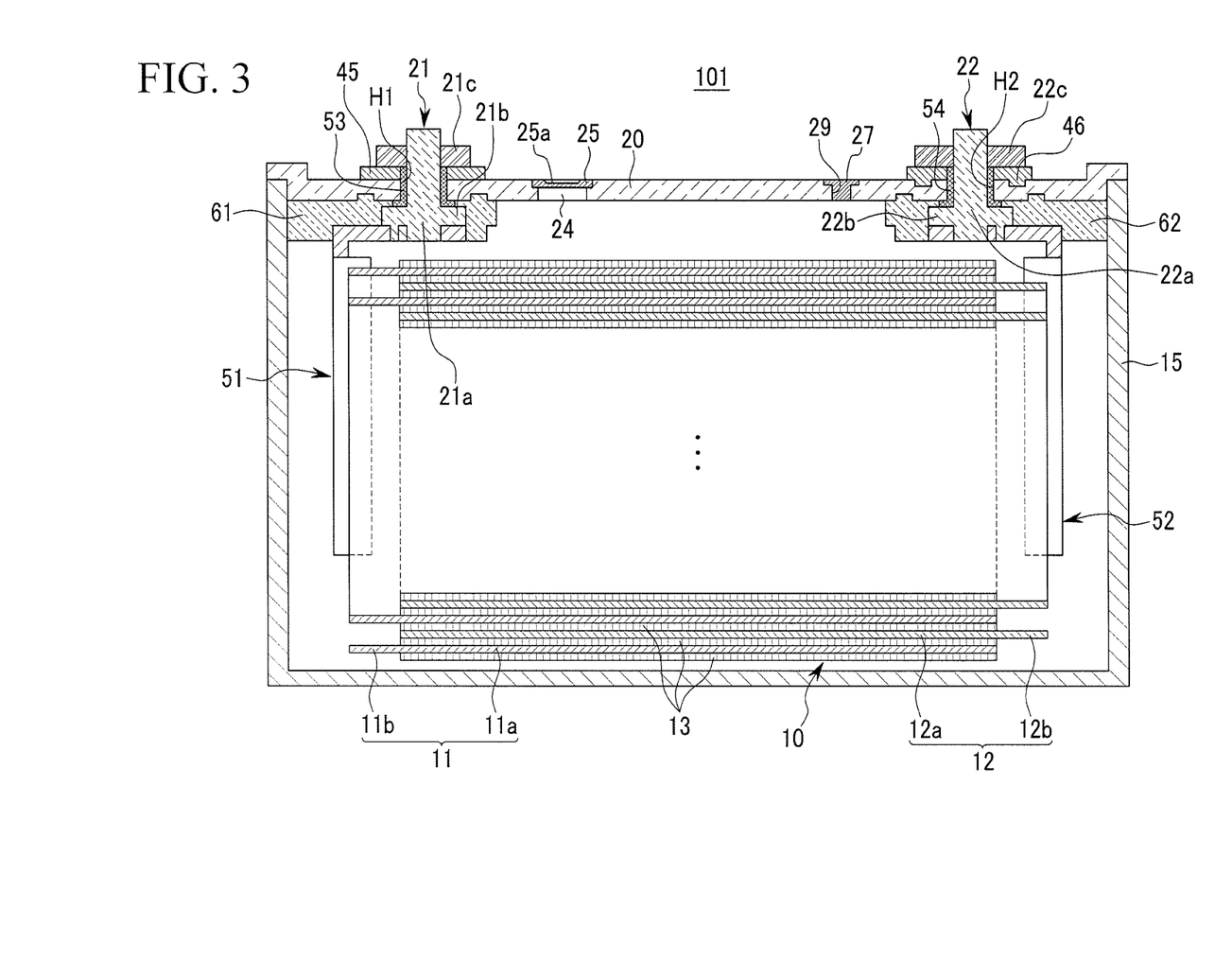
FIG. 3 illustrates a cross-sectional view of FIG. 2 taken along line III-III.

FIG. 2 is a perspective view of the rechargeable battery 101, and FIG. 3 is a cross-sectional view of FIG. 2 along line III-III.

Referring to FIGS. 2 and 3, the rechargeable battery 101 may include an electrode assembly 10 for performing charging and discharging operations, a case 15 for accommodating the electrode assembly 10, a cap plate 20 combined to an opening of the case 15, and a first electrode terminal 21 (e.g., a positive terminal) with a second electrode terminal 22 (e.g., a negative terminal) that are installed in the cap plate 20. For example, the electrode assembly 10 may be formed by disposing a first electrode 11 (hereinafter referred to as a "positive electrode 11") and a second electrode 12 (hereinafter referred to as a "negative electrode 12") at respective sides of a separator 13, which operates as an insulator, and then spirally-winding the positive electrode 11, the separator 13, and the negative electrode 12 in a jelly-roll shape.

The positive and negative electrodes 11 and 12 respectively include coated regions 11a and 12a, where an active material is coated on a current collector, and uncoated regions 11b and 12b, where the active material is not coated thereon to expose the current collector. The uncoated region 11b of the positive electrode 11 is formed at one end portion of the positive electrode 11 along the spirally wound positive electrode 11. The uncoated region 12b of the negative electrode 12 is formed at one lateral end of the negative electrode 12 along the spirally wound negative electrode 12.

The uncoated regions 11b and 12b are disposed at opposite ends of the electrode assembly 10.

As an example, the case 15 may be roughly formed in a cuboid shape to accommodate the electrode assembly 10 and an electrolyte solution, and an opening may b e formed at one side of the cuboid to connect inner and outer spaces thereof. The opening is formed to allow the electrode assembly 10 to be inserted into the case 15.

The cap plate 20 may be formed to have a plate shape, and may be installed in the opening of the case 15 to seal the case 15. For example, the case 15 and the cap plate 20 may be formed of aluminum, e.g., such that they are welded to each other.

In addition, an electrolyte injection opening 29, a vent hole 24, and terminal holes H1 and H2 are provided in the cap plate 20. After combining the cap plate 20 to the case 15, the electrolyte injection opening 29 allows the electrolyte solution to be injected into the case 15. After injecting the electrolyte solution, the electrolyte injection opening 29 is sealed by a sealing cap 27.

The vent hole 24 is sealed by a vent plate 25 such that it releases internal pressure of the rechargeable battery 101. When the internal pressure of the rechargeable battery 101 reaches a predetermined pressure, the vent plate 25 is ruptured to open the vent hole 24. The vent plate 25 has a notch 25a that induces the rupture.

Figure 4:
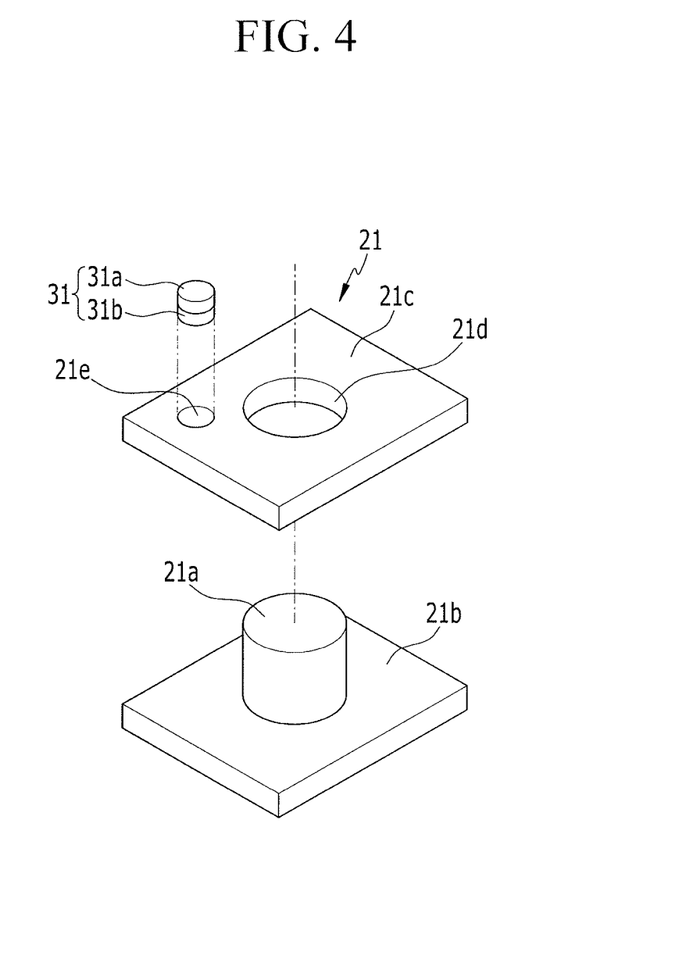
FIG. 4 illustrates an exploded perspective view of a first electrode terminal according to the first exemplary embodiment.

The first and second electrode terminals 21 and 22 extend through terminal holes H1 and H2, respectively, as will be described in more detail below with reference to FIGS. 4-5. FIG. 4 is an exploded perspective view of the first electrode terminal 21, and FIG. 5 is an exploded perspective view of the second electrode terminal 22.

Figure 5:
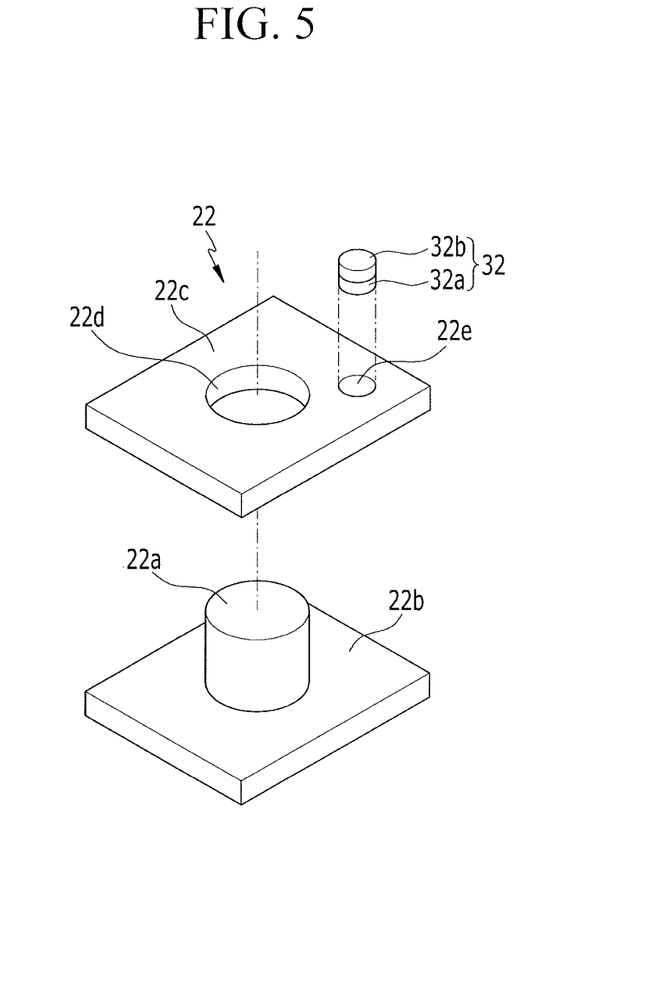
FIG. 5 illustrates an exploded perspective view of a second electrode terminal according to the first exemplary embodiment.

Referring to FIGS. 3 to 5, the first electrode terminal 21 and the second electrode terminal 22 are installed in the terminal holes H1 and H2 of the cap plate 20, and are electrically coupled to the electrode assembly 10. That is, the first electrode terminal 21 is electrically coupled to the positive electrode 11 of the electrode assembly 10, and the second electrode terminal 22 is electrically coupled to the negative electrode 12 of the electrode assembly 10. Accordingly, the electrode assembly 10 is drawn out of the case 15 through the first and second electrode terminals 21 and 22.

The first electrode terminal 21 may include a first pillar terminal 21a that is installed in the terminal hole H1 of the cap plate 20, a first flange 21b that is integrally and widely formed with the first pillar terminal 21a inside of the cap plate 20, and a first plate terminal 21c that is disposed outside of the cap plate 20 and is inserted by the first pillar terminal 21a to be combined thereto. The first plate terminal 21c may be formed as a quadrangular plate, and is disposed on the cap plate 20.

A hole 21d is formed at, e.g., a center of, the first plate terminal 21c to insert the first pillar terminal 21a therethrough, and the first pillar terminal 21a penetrates the first plate terminal 21c to protrude thereabove. The first flange 21b protrudes from a lower end of the first pillar terminal 21a, and is disposed below the cap plate 20.

As further illustrated in FIG. 4, the first plate terminal 21c has a first terminal magnet 31, and a first receiving hole 21e is formed in the first plate terminal 21c to accommodate the first terminal magnet 31 therein. That is, the first terminal magnet 31 is inserted through the first receiving hole 21e. The first receiving hole 21e may be formed at a first corner portion of the first plate terminal 21c.

The first terminal magnet 31 may be formed to have a cylindrical shape, and has an N pole 31a and an S pole 31b. The first terminal magnet 31 is disposed such that the N pole 31a is directed upward. The first terminal magnet 31 is fixed to the first plate terminal 21c by an adhesive and the like.

Referring back to FIG. 3, a positive electrode gasket 53 may be installed between the first pillar terminal 21a and an inner side of the terminal hole H1 of the cap plate 20 to seal and electrically insulate between the first pillar terminal 21a and the cap plate 20. The positive electrode gasket 53 may be installed to be further elongated between the first flange 21b and the inner side of the cap plate 20, thereby further sealing and electrically insulating between the first flange 21b and the cap plate 20. That is, the positive electrode gasket 53 and first electrode terminal 21 are installed in the cap plate 20 to prevent leakage of the electrolyte solution through the terminal hole H1.

A positive electrode lead tab 51 electrically couples the first electrode terminal 21 to the positive electrode 11 of the electrode assembly 10. That is, by combining the positive electrode lead tab 51 to the lower end of the first pillar terminal 21a, and then caulking the lower end thereof, the positive electrode lead tab 51 is supported by the first flange 21b and is coupled to the lower end of the first pillar terminal 21a.

A positive electrode insulating member 61 is installed between the positive electrode lead tab 51 and the cap plate 20 to electrically insulate the positive electrode lead tab 51 from the cap plate 20. In addition, one side of the positive electrode insulating member 61 is coupled to the cap plate 20 while the other side encloses the positive electrode lead tab 51, the first pillar terminal 21a, and the first flange 21b, thereby stabilizing a connection structure therebetween.

An upper insulating member 45 is installed between the first plate terminal 21c and the cap plate 20. The upper insulating member 45 electrically insulates the first plate terminal 21c from the cap plate 20.

As illustrated in FIG. 5, the second electrode terminal 22 may include a second pillar terminal 22a that is installed in the terminal hole H2 of the cap plate 20, a second flange 22b that is integrally and widely formed with the second pillar terminal 22a inside of the cap plate 20, and a second plate terminal 22c that is disposed outside of the cap plate 20 to be coupled to the second pillar terminal 22a. The second plate terminal 22c may be formed as a quadrangular plate, and is disposed on the cap plate 20.

A hole 22d is formed at, e.g., a center of, the second plate terminal 22c to have the second pillar terminal 22a inserted therethrough, and the second pillar terminal 22a penetrates the second plate terminal 22c to protrude thereabove. The second flange 22b protrudes from a lower end of the second pillar terminal 22a, and is disposed below the cap plate 20.

As further illustrated in FIG. 5, the second plate terminal 22c has a second terminal magnet 32, and a second receiving hole 22e is formed in the second plate terminal 22c to accommodate the second terminal magnet 32. That is, the second terminal magnet 32 is inserted through the second receiving hole 22e. The second receiving hole 22e may be formed at a second corner portion of the second plate terminal 22c.

The second receiving hole 22e may be formed at a different corner portion of the second plate terminal 22c relative to the corner portion of the first plate terminal 21c including the first receiving hole 21e. For example, the second corner portion including the second receiving hole 22e is disposed diagonally with respect to the first corner portion including the first receiving hole 21e, so the second receiving hole 22e through the second plate terminal 22c is disposed diagonally with respect to the first receiving hole 21e in the first plate terminal 21c.

That is, when the second plate terminal 22c is equally divided into four parts by lines that pass the center of the second plate terminal 22c and cross each other, the second receiving hole 22e may be disposed in a first quadrant. In addition, when the first plate terminal 21c is equally divided into four parts by lines that pass the center of the first plate terminal 21c and cross each other, the first receiving hole 21e may be disposed in a third quadrant. In this respect, it is noted that the quadrants in each of the first and second plate terminals 21c and 22c are counted in a same direction and from a same starting point, e.g., the starting points in both the first and second plate terminals 21c and 22c are on the right hand side of the respective first and second pillar terminals 21a and 22a when viewed in FIG. 3.

The second terminal magnet 32 may be formed to have a cylindrical shape, and includes an N pole 32a and an S pole 32b. The second terminal magnet 32 is disposed such that the S pole 32b is directed upward. The second terminal magnet 32 is fixed to the second plate terminal 22c by an adhesive and the like.

Referring back to FIG. 3, a negative electrode gasket 54 may be installed between the second pillar terminal 22a and an inner side of the terminal hole H2 of the cap plate 20 to seal and electrically insulate between the second pillar terminal 22a and the cap plate 20. The negative electrode gasket 54 is installed to be further elongated between the second flange 22b and the inner side of the cap plate 20, thereby further sealing and electrically insulating between the second flange 22b and the cap plate 20. That is, the negative electrode gasket 54 and the second electrode terminal 22 are installed in the cap plate 20 to prevent leakage of the electrolyte solution through the terminal hole H2.

A negative electrode lead tab 52 electrically couples the second electrode terminal 22 to the negative electrode 12 of electrode assembly 10. That is, by combining the negative electrode lead tab 52 to the lower end of the second pillar terminal 22a, and then caulking the lower end thereof the negative electrode lead tab 52 is supported by the second flange 22b and is coupled to the lower end of the second pillar terminal 22a.

A negative electrode insulating member 62 is installed between the negative electrode lead tab 52 and the cap plate 20 to electrically insulate the negative electrode lead tab 52 from the cap plate 20. In addition, one side of the negative electrode insulating member 62 is coupled to the cap plate 20 while the other side encloses the negative electrode lead tab 52, the second pillar terminal 22a, and the second flange 22b, thereby stabilizing a connecting structure therebetween.

An upper insulating member 46 is installed between the second plate terminal 22c and the cap plate 20, and the upper insulating member 46 electrically insulates the second plate terminal 22c from the cap plate 20. The upper insulating member 46 is interposed between the second plate terminal 22c and the cap plate 20, and is penetrated by the second pillar terminal 22a.

Figure 6:
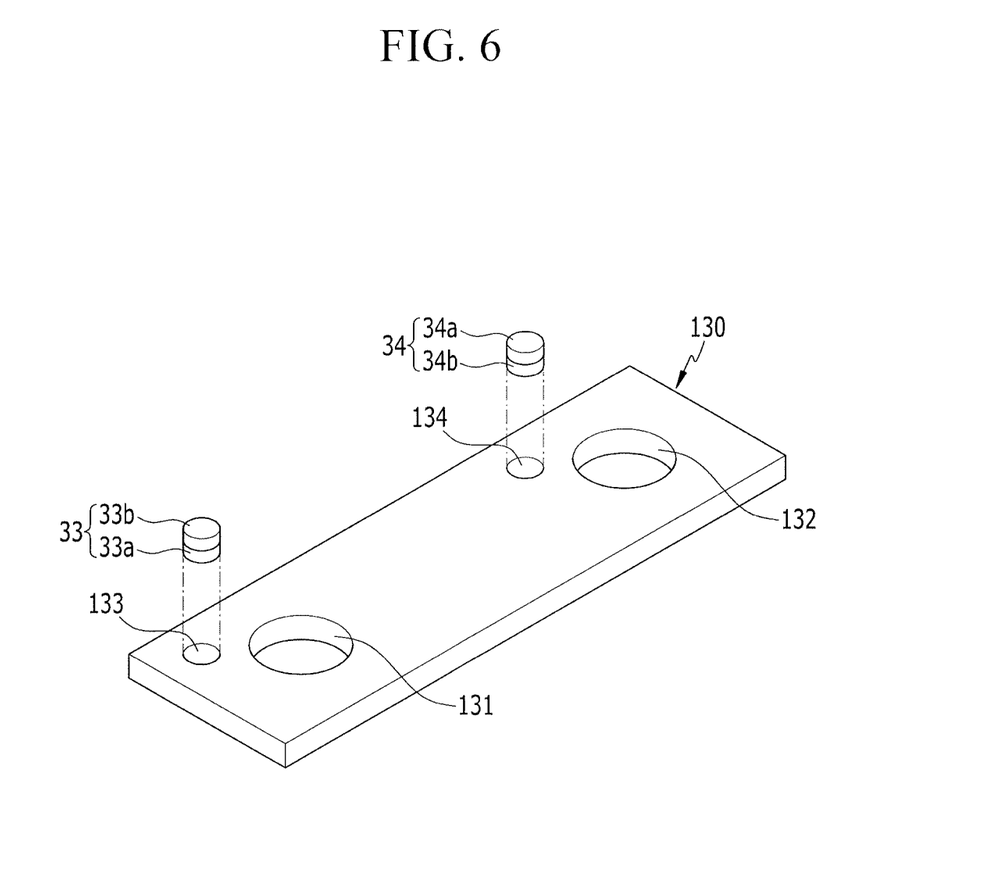
FIG. 6 illustrates an exploded perspective view of a first connector according to the first exemplary embodiment.
Figure 7:
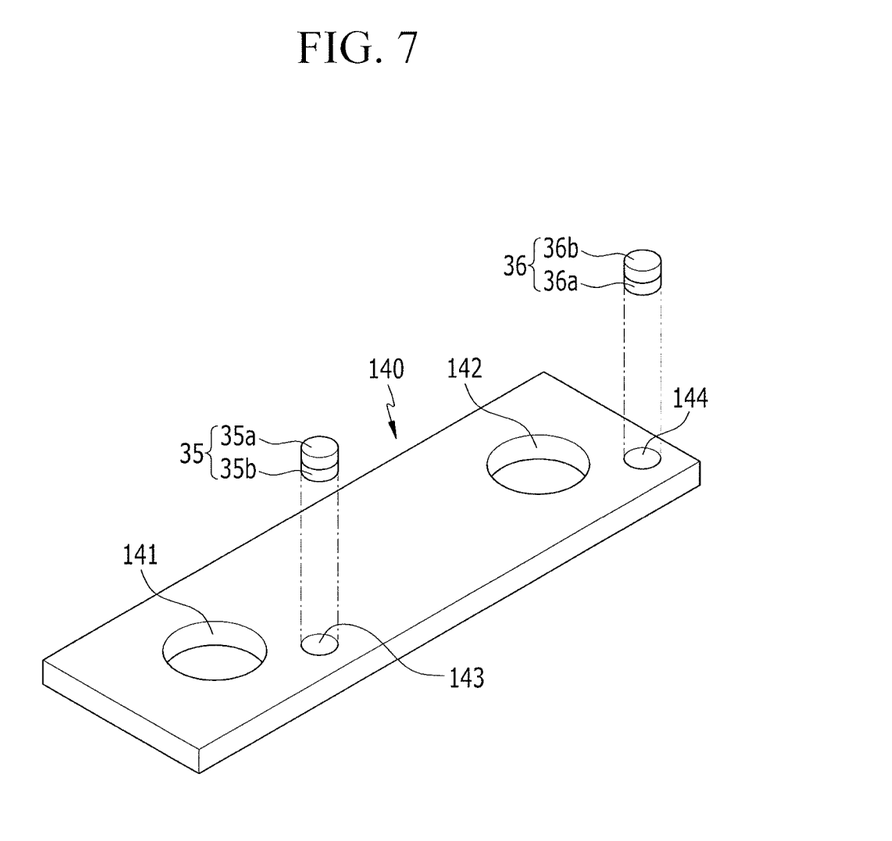
FIG. 7 illustrates an exploded perspective view of a second connector according to the first exemplary embodiment.

FIG. 6 is an exploded perspective view of the first connector according to the first exemplary embodiment, and FIG. 7 is an exploded perspective view of the second connector according to the first exemplary embodiment.

Referring to FIGS. 1, 6, and 7, the first connector 130 electrically couples the first electrode terminal 21 of one rechargeable battery and the second electrode terminal 22 of another, e.g., adjacent, rechargeable battery. The first connector 130 may be formed to have a rectangular plate shape, and a first fastening hole 131 and a second fastening hole 132 are formed in the first connector 130 to accommodate insertion of the first and second pillar terminals 21a and 22a, respectively, therethrough.

The first connector 130 includes a first connecting magnet 33 combined to the first terminal magnet 31, and a second connecting magnet 34 combined to the second terminal magnet 32. That is, once the first connector 130 in inserted through the first and second pillar terminals 21a and 22a, the first and second connecting magnets 33 and 34 are aligned with and combined to the first and second terminal magnets 31 and 32, respectively.

In detail, a first hole 133 and a second hole 134 are formed in the first connector 130 to have the first and second connecting magnets 33 and 34 inserted thereinto, respectively. In this case, the first connecting magnet 33 is installed at a first corner portion of the first connector 130, and the second connecting magnet 34 is disposed further inward than the first connecting magnet 33, e.g., the second connecting magnet 34 is disposed between the first corner portion of the first connector 130 and a second corner portion of the first connector 130.

The first connecting magnet 33 includes an N pole 33a and an S pole 33b, and is disposed such that the S pole 33b is directed downward. In addition, the second connecting magnet 34 includes an N pole 34a and an S pole 34b, and is disposed such that the N pole 34a is directed downward. The first and second connecting magnets 33 and 34 are fixed to the first connector 130 by an adhesive and the like.

The second connector 140 electrically couples the second electrode terminal 22 of one rechargeable battery and the first electrode terminal 21 of the other rechargeable battery.

The second connector 140 may be formed to have a rectangular plate shape, and a first fastening hole 141 and a second fastening hole 142 are formed in the first connector 140 to have the first and second pillar terminals 21a and 22a inserted therethrough, respectively.

The second connector 140 includes the first connecting magnet 35 combined to the first terminal magnet 31, and the second connecting magnet 36 combined to the second terminal magnet 32. That is, once the second connector 140 in inserted through the first and second pillar terminals 21a and 22a, the first and second connecting magnets 35 and 36 are aligned with and combined to the first and second terminal magnets 31 and 32, respectively.

In detail, a first hole 143 and a second hole 144 are formed in the second connector 140 to have the first and second connecting magnets 35 and 36 inserted therethrough, respectively. In this case, the second connecting magnet 36 is installed at one corner portion of the second connector 140, and the first connecting magnet 35 is disposed further inward than the second connecting magnet 36.

The first connecting magnet 35 includes an N pole 35a and an S pole 35b, and is disposed such that the S pole 35b is directed downward. In addition, the second connecting magnet 36 includes an N pole 36a and an S pole 36b, and is disposed such that the N pole 36a is directed downward. The first and second connecting magnets 35 and 36 are fixed to the second connector 140 by an adhesive and the like.

As described above, positions at which the first connecting magnets 33 and 35 and the second connecting magnets 34 and 36 of the first and second connectors 130 and 140 are installed are different. In this case, the S poles 33b and 35b of the first connecting magnets 33 and 35 are disposed below to be coupled to the first terminal magnet 31, and the N poles 34a and 36a of the second connecting magnets 34 and 36 are disposed above to be coupled to the second terminal magnet 32.

In addition, the first connector 130 is disposed at one side of the battery array in a width direction thereof, and the second connector 140 is disposed at the other side of the battery array in the width direction thereof. For example, as illustrated in FIG. 1, the first connector 130 is disposed at the left of the battery array based on a center thereof, while the second connector 140 is disposed at the right of the battery array based on the center thereof.

As described above, since the first connector 130 and the second connector 140 are differently configured, i.e., have different arrangements of the respective N and S poles in different corners on the first and second connectors 130 and 140, the first electrode terminal 21 and the second electrode terminal 22 cannot be combined incorrectly due to the magnetic force even if they are misaligned. Therefore, misassembly of the rechargeable batteries 101 may be prevented.

In addition, the first and second connectors 130 and 140 may be easily attached to the first and second electrode terminals 21 and 22, respectively, due to the magnetic force therebetween. Further, the first and second connectors 130 and 140 may prevent contact failure due to loosening of a nut and the like, as separate loose members, e.g., nuts, are not used therewith. Finally, when replacement or maintenance of the rechargeable batteries 101 is needed, the first and second connectors 130 and 140 may be easily detached from the rechargeable batteries 101.

Figure 8:
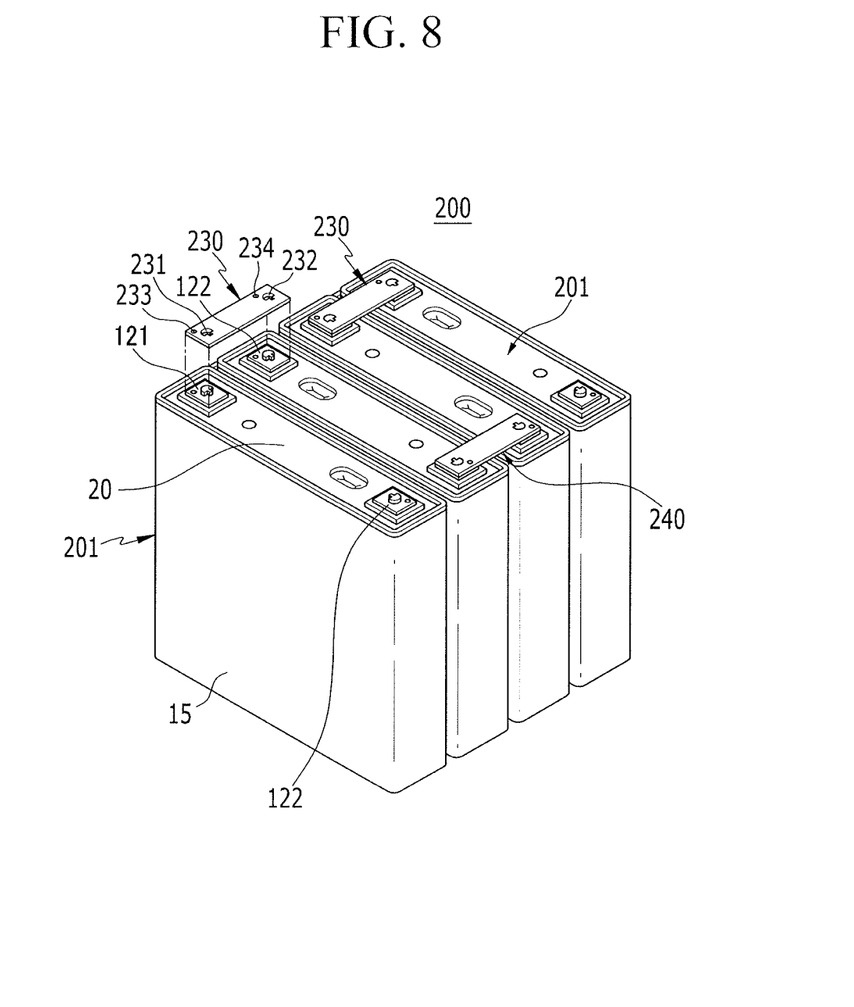
FIG. 8 illustrates a perspective view of a battery module according to a second exemplary embodiment.
Figure 9:
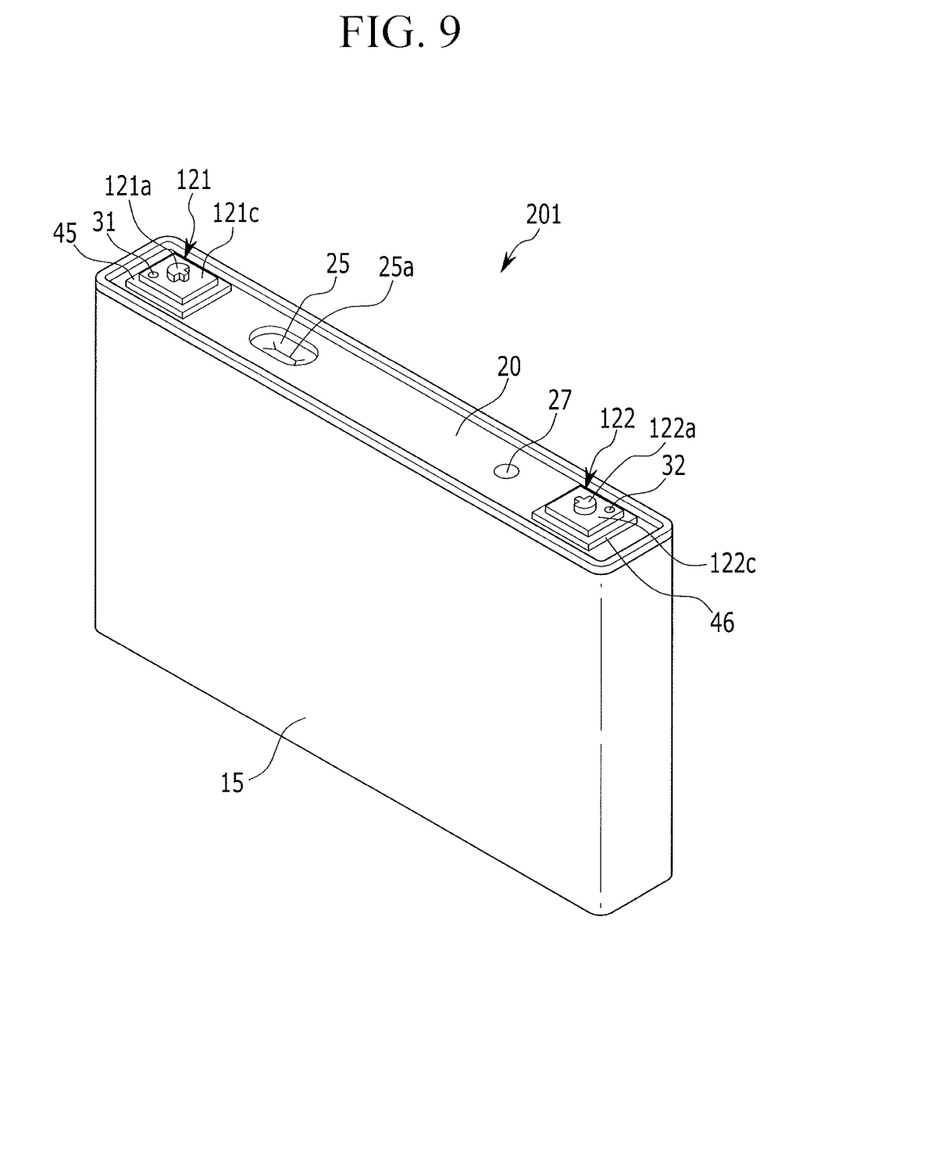
FIG. 9 illustrates a perspective view of a rechargeable battery according to the second exemplary embodiment.

FIG. 8 is a perspective view of a battery module according to a second exemplary embodiment, and FIG. 9 is a perspective view of a rechargeable battery according to the second exemplary embodiment.

Referring to FIGS. 8 and 9, a battery module 200 of the second exemplary embodiment may include a plurality of rechargeable batteries 201 and a connector for electrically connecting the rechargeable batteries 201. The connector may include a first connector 230 and a second connector 240. The rechargeable batteries 201 may be stackingly arranged, and may be connected in series by the first and second connectors 230 and 240.

Since the battery module 200 according to the present exemplary embodiment has the same structure as the battery module according to the aforementioned first exemplary embodiment in FIGS. 1-7, except for terminals and connectors, a repeated description of the same structures will be omitted.

Figure 10:
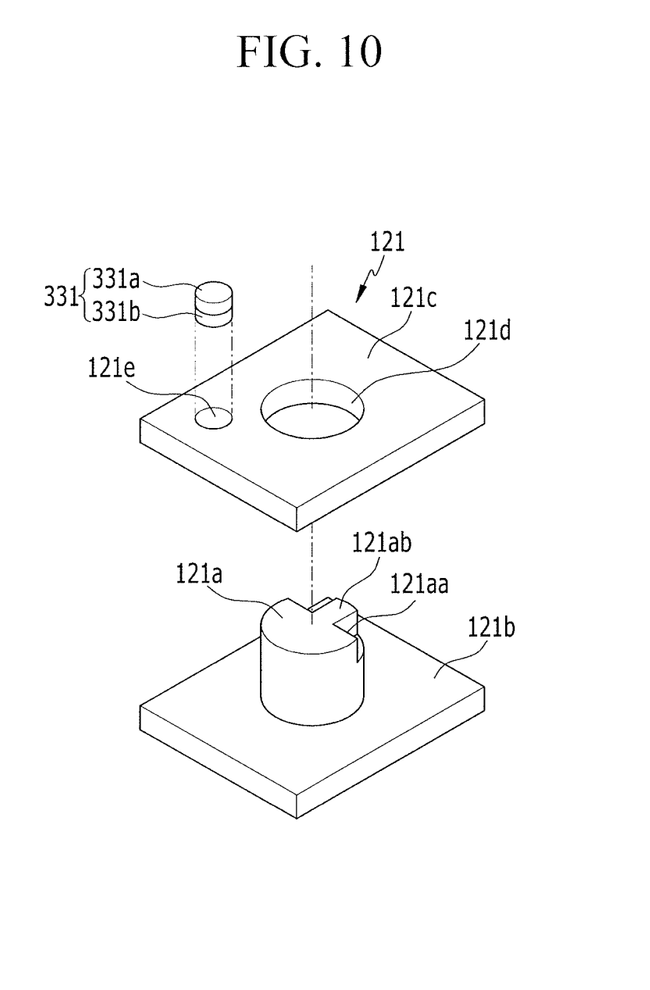
FIG. 10 illustrates an exploded perspective view of a first electrode terminal according to the second exemplary embodiment.
Figure 11:
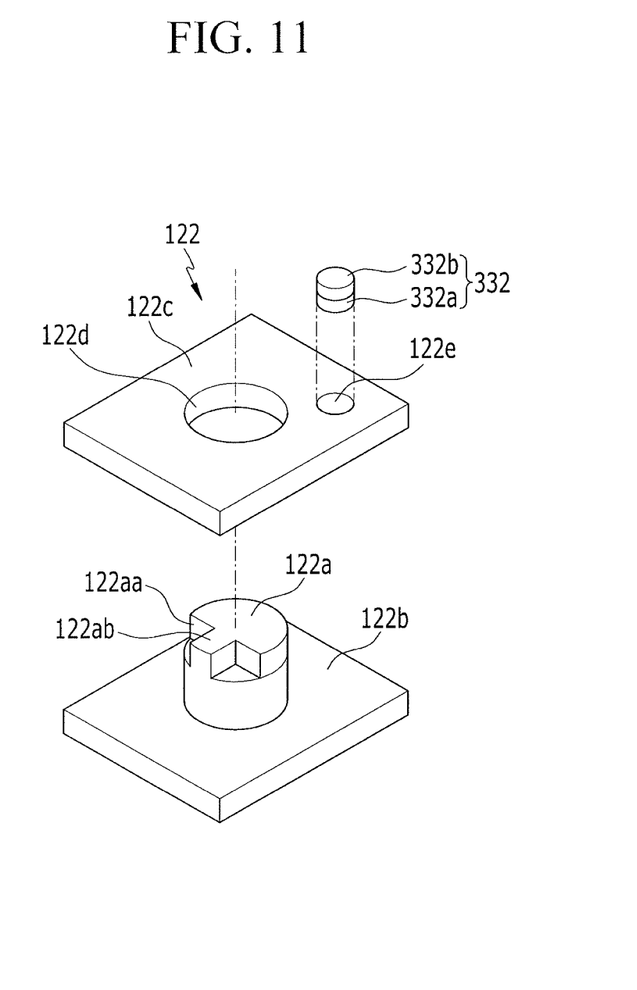
FIG. 11 illustrates an exploded perspective view of a second electrode terminal according to the second exemplary embodiment.

FIG. 10 is an exploded perspective view of a first electrode terminal according to the second exemplary embodiment, and FIG. 11 is an exploded perspective view of a second electrode terminal according to the second exemplary embodiment.

Referring to FIGS. 9 to 11, the rechargeable battery 201 may include the case 15, the cap plate 20 combined to the opening of the case 15, and first and second electrode terminals 121 and 122 installed in the cap plate 20.

The first electrode terminal 121 may include a first pillar terminal 121a that may have a cylindrical shape, a first flange 121b that may be integrally and widely formed with the pillar terminal 121a inside of the cap plate 20, and a first plate terminal 121c that is disposed outside of the cap plate 20 to be coupled to the pillar terminal 121a. The pillar terminal 121a may be formed to have a cylindrical shape, an upper end of which is formed with a stepped groove 121aa, and a supporting protrusion 121ab is formed in the stepped groove 121aa to protrude in a lateral direction. The supporting protrusion 121ab upwardly protrudes from a bottom of the stepped groove 121aa. The first plate terminal 121c is formed as a quadrangular plate, and is disposed on the cap plate 20.

A hole 121d may be formed at, e.g., a center of, the first plate terminal 121c to accommodate insertion of the first pillar terminal 121a therethrough, so the first pillar terminal 121a penetrates the first plate terminal 121c to protrude thereabove. The first flange 121b protrudes from a lower end of the first pillar terminal 121a, and is disposed below the cap plate 20. Since the first plate terminal 121c has a first terminal magnet 331, a first receiving hole 121e is formed in the first plate terminal 121c to accommodate insertion of the first terminal magnet 331 therethrough. The first receiving hole 121e is formed at one corner portion of the first plate terminal 121c.

The first terminal magnet 331 is formed to have a cylindrical shape, and includes an N pole 331a and an S pole 331b. The first terminal magnet 331 is disposed such that the N pole 331a is directed upward. The first terminal magnet 331 is fixed to the first plate terminal 121c by an adhesive and the like.

The second electrode terminal 122 may include a second pillar terminal 122a that has a cylindrical shape, a second flange 122b that is integrally and widely formed with the pillar terminal 122a inside of the cap plate 20, and a second plate terminal 122c that is disposed outside of the cap plate 20 to be coupled to the second pillar terminal 122a. The pillar terminal 122a may be formed to have a cylindrical shape, an upper end of which is formed with a stepped groove 122aa, and a supporting protrusion 122ab is formed in the stepped groove 122aa to protrude in a lateral direction. The supporting protrusion 122ab upwardly protrudes from a bottom of the stepped groove 122aa. The second plate terminal 122c is formed as a quadrangular plate, and is disposed on the cap plate 20.

A hole 122d is formed at, e.g., a center of, the second plate terminal 122c to accommodate insertion of the second pillar terminal 122a therethrough, so the second pillar terminal 122a penetrates the second plate terminal 22c to protrude thereabove. The second flange 122b protrudes from a lower end of the second pillar terminal 122a, and is disposed below the cap plate 20.

Since the second plate terminal 122c has a second terminal magnet 332, a second receiving hole 122e is formed in the second plate terminal 122c to accommodate insertion of the second terminal magnet 332 therethrough. The second receiving hole 122e is formed at the other corner portion of the second plate terminal 122c. In this case, the other corner portion is diagonally disposed with respect to one corner portion, and the second receiving hole 122e is diagonally disposed with respect to the first receiving hole 121e that is formed in the first plate terminal 121c.

The second terminal magnet 332 may have a cylindrical shape, and includes an N pole 332a and an S pole 332b. The second terminal magnet 332 is disposed such that the S pole 332b is directed upward. The second terminal magnet 332 is fixed to the second plate terminal 122c by an adhesive and the like.

Figure 12:
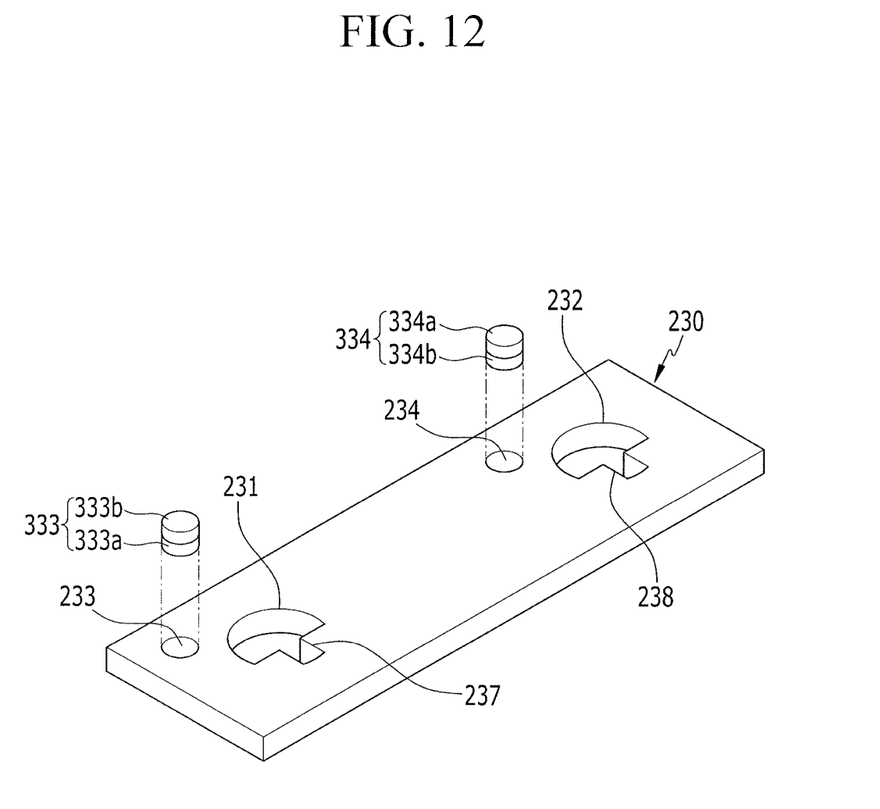
FIG. 12 illustrates an exploded perspective view of a first connector according to the second exemplary embodiment.
Figure 13:
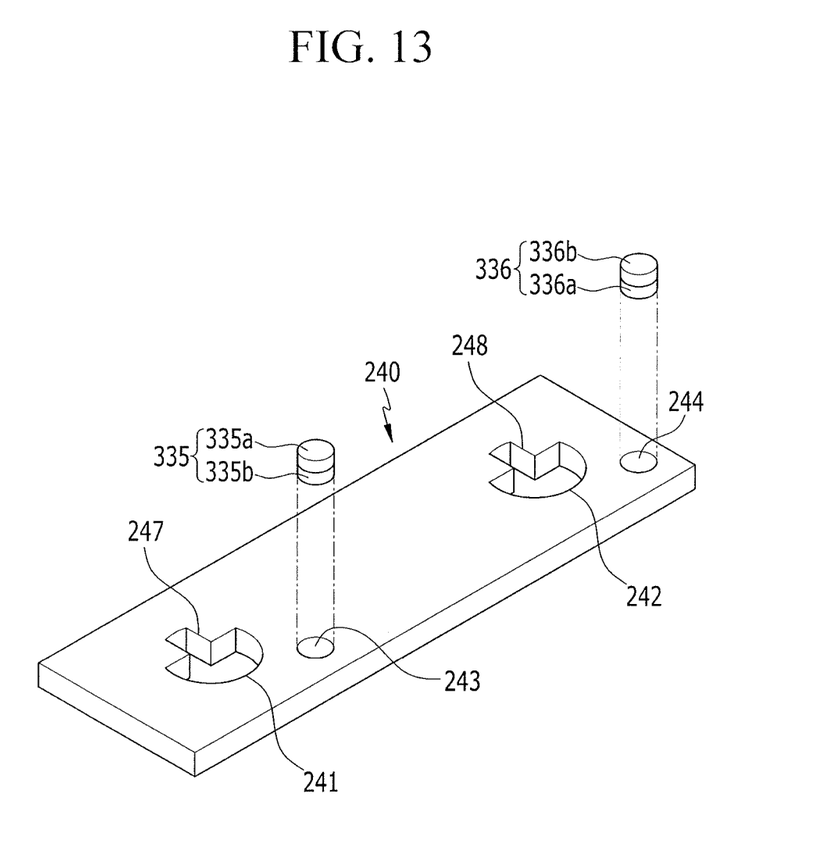
FIG. 13 illustrates an exploded perspective view of a second connector according to the second exemplary embodiment.

FIG. 12 is an exploded perspective view of a first connector according to the second exemplary embodiment, and FIG. 13 is an exploded perspective view of a second connector according to the second exemplary embodiment.

Referring to FIGS. 8, 12, and 13, the first connector 230 electrically couples the first electrode terminal 121 of one rechargeable battery and the second electrode terminal 122 of another, e.g., adjacent, rechargeable battery. The first connector 230 may be formed to have a rectangular plate shape, and a first fastening hole 231 and a second fastening hole 232 are formed in the first connector 230 to respectively accommodate insertion therethrough by the first and second pillar terminals 121a and 122a.

A supporting groove 237 is formed in the first fastening hole 231 to accommodate insertion of the supporting protrusion 121ab therethrough, and a supporting groove 238 is formed in the second fastening hole 232 to accommodate insertion of the supporting protrusion 122ab therethrough. The supporting grooves 237 and 238 are formed such that they are depressed from the fastening holes 231 and 232 in the same direction.

The first connector 230 includes a first connecting magnet 333 combined to the first terminal magnet 331, and a second connecting magnet 334 combined to the second terminal magnet 332. A first hole 233 and a second hole 234 are formed in the first connector 230 to respectively accommodate insertion of the first and second connecting magnets 333 and 334 therethrough.

The first connecting magnet 333 includes an N pole 333a and an S pole 333b, and is disposed such that the S pole 333b is directed downward. In addition, the second connecting magnet 334 includes an N pole 334a and an S pole 334b, and is disposed such that the N pole 334a is directed downward. The first and second connecting magnets 333 and 334 are fixed to the first connector 230 by an adhesive and the like.

The second connector 240 electrically couples the second electrode terminal 122 of one rechargeable battery and the first electrode terminal 121 of the other rechargeable battery. The second connector 240 may be formed to have a rectangular plate shape, and a first fastening hole 241 and a second fastening hole 242 are formed in the first connector 140 to respectively accommodate insertion of the first and second pillar terminals 121a and 122a therethrough.

A supporting groove 247 is formed in the first fastening hole 241 to accommodate insertion of the supporting protrusion 121ab therethrough, and a supporting groove 248 is formed in the second fastening hole 242 to accommodate insertion of the supporting protrusion 122ab therethrough. The supporting grooves 247 and 248 are formed such that they are depressed from the fastening holes 241 and 242 in the same direction.

The second connector 240 includes a first connecting magnet 335 combined to the first terminal magnet 331, and a second connecting magnet 336 combined to the second terminal magnet 332. A first hole 243 and a second hole 244 are formed in the second connector 240 to respectively accommodate insertion of the first and second connecting magnets 335 and 336 therethrough.

The first connecting magnet 335 includes an N pole 335a and an S pole 335b, and is disposed such that the S pole 335b is directed downward. In addition, the second connecting magnet 336 includes an N pole 336a and an S pole 336b, and is disposed such that the N pole 336a is directed downward.

By way of summation and review, electrode terminals of rechargeable batteries are connected by a bus bar. When the bus bar is fixed by a nut, vibrations may cause the nut to become loose, thereby causing connection failures. When the bus bar is fixed to the terminals by welding, a defective cell cannot be detached from the battery module.

In contrast, a rechargeable battery and a battery module according to embodiments have reduced occurrence of connection failures, and provide easier connection with other rechargeable batteries. That is, according to exemplary embodiments, terminal magnets are installed in the electrode terminals of the rechargeable batteries, and the connectors are attached to the electrode terminals by the magnetic force.

Therefore, contact failures between the connectors and the electrode terminals due to loosening of a nut and the like may be prevented or substantially minimized, and attachment between the connectors and the electrode terminals may be facilitated.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly;
   a case accommodating the electrode assembly; and
   first and second electrode terminals electrically coupled to the electrode assembly and protruding out of the case, the first electrode terminal having a first terminal magnet, and the second electrode terminal having a second terminal magnet,
   wherein each of the first and second electrode terminals includes a plate terminal with a receiving hole, the first and second terminal magnets being inside respective receiving holes.

2. A rechargeable battery, comprising:
   an electrode assembly;
   a case accommodating the electrode assembly; and
   first and second electrode terminals electrically coupled to the electrode assembly and protruding out of the case, the first electrode terminal having a first terminal magnet, and the second electrode terminal having a second terminal magnet,
   wherein the first terminal magnet includes an N pole directed upward, and the second terminal magnet includes an S pole directed upward.

3. The rechargeable battery as claimed in claim 2, wherein the first electrode terminal includes a first plate terminal with a first receiving hole, the first terminal magnet being inserted in the first receiving hole.

4. The rechargeable battery as claimed in claim 3, wherein the second electrode terminal includes a second plate terminal with a second receiving hole, the second terminal magnet being inserted in the second receiving hole.

5. The rechargeable battery as claimed in claim 4, wherein the first receiving hole is at a first corner portion of the first plate terminal, and the second receiving hole is at a second corner portion of the second plate terminal.

6. The rechargeable battery as claimed in claim 5, wherein the second corner portion is diagonally disposed with respect to the first corner portion.

7. The rechargeable battery as claimed in claim 1, wherein the first electrode terminal includes:
   a rod-shaped first pillar terminal, an upper part of the rod-shaped first pillar terminal including a stepped groove, and
   a supporting protrusion in the stepped groove, the supporting protrusion protruding in a lateral direction.

8. A battery module, comprising:
   rechargeable batteries having first and second electrode terminals that protrude outward; and
   a connector electrically coupling the rechargeable batteries, the connector being magnetically attached to the first and second electrode terminals,
   wherein the first electrode terminal includes a rod-shaped first pillar terminal, the first pillar terminal being inserted in a first fastening hole of the connector.

9. The battery module as claimed in claim 8, wherein the first electrode terminal includes a first terminal magnet, and the second electrode terminal includes a second terminal magnet.

10. The battery module as claimed in claim 9, wherein the first electrode terminal includes a first plate terminal with a first receiving hole, the first terminal magnet being inserted in the first receiving hole.

11. The battery module as claimed in claim 9, wherein the first terminal magnet includes an N pole directed upward, and the second terminal magnet includes an S pole directed upward.

12. The battery module as claimed in claim 11, wherein the connector includes a first connecting magnet combined to the first terminal magnet, and a second connecting magnet combined to the second terminal magnet.

13. The battery module as claimed in claim 12, wherein the connector includes a first connector and a second connector, positions of the connecting magnets of the first and second connectors being different from each other.

14. The battery module as claimed in claim 13, wherein the first connector includes first and second holes, the first and second connecting magnets being inserted into the first and second holes, respectively.

15. The battery module as claimed in claim 14, wherein the first connecting magnet includes an S pole directed downward, and the second connecting magnet includes an N pole directed downward.

16. The battery module as claimed in claim 15, wherein the first connecting magnet is at a first corner portion of the first connector, and the second connecting magnet is at a second corner portion of the second connector.

17. The battery module as claimed in claim 8, wherein an upper part of the first pillar terminal includes a stepped groove, and a supporting protrusion protruding in the stepped groove, the supporting protrusion being inserted in a supporting groove of the first fastening hole.

* * * * *